(12) United States Patent
Koukoumidis et al.

(10) Patent No.: US 12,223,015 B2
(45) Date of Patent: Feb. 11, 2025

(54) HUMAN-AUGMENTED ARTIFICIAL INTELLIGENCE CONFIGURATION AND OPTIMIZATION INSIGHTS

(71) Applicant: Google LLC, Mountain View, CA (US)

(72) Inventors: Emmanouil Koukoumidis, Mountain View, CA (US); Nikolaos Kofinas, Mountain View, CA (US); Evan Huang, Mountain View, CA (US); Kiran Bellare, Mountain View, CA (US); Xiao Liu, San Francisco, CA (US); Michael Lanning, Mountain View, CA (US); Lukas Rutishauser, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 252 days.

(21) Appl. No.: 17/651,414

(22) Filed: Feb. 16, 2022

(65) Prior Publication Data

US 2023/0195847 A1    Jun. 22, 2023

Related U.S. Application Data

(60) Provisional application No. 63/290,332, filed on Dec. 16, 2021.

(51) Int. Cl.
  *G06F 40/295*    (2020.01)
  *G06F 18/20*    (2023.01)
  *G06F 18/21*    (2023.01)

(52) U.S. Cl.
  CPC ........ *G06F 18/2193* (2023.01); *G06F 18/285* (2023.01); *G06F 40/295* (2020.01)

(58) Field of Classification Search
  None
  See application file for complete search history.

(56) References Cited

U.S. PATENT DOCUMENTS

| 10,628,834 | B1* | 4/2020 | Agarwal | G16H 10/60 |
| 2011/0099184 | A1* | 4/2011 | Symington | G06F 16/34 |
| | | | | 707/755 |
| 2017/0132636 | A1* | 5/2017 | Caldera | G06Q 20/4016 |

(Continued)

OTHER PUBLICATIONS

International Search Report and Written Opinion for the related Application PCT/US2022/080931, dated Mar. 22, 2023, 59 pages.

(Continued)

*Primary Examiner* — Jesse S Pullias
(74) *Attorney, Agent, or Firm* — DORITY & MANNING P.A.

(57) ABSTRACT

A computer-implemented method includes receiving a document insight request that requests document insights for a corpus of documents. The document insight request includes the corpus of documents, a set of entities contained within each document of the corpus of documents, and document insight request parameters that includes a confidence value threshold. The method also includes generating the document insights for the corpus of documents based on the confidence value threshold. Here, the document insights include an accuracy target and a user review rate target. The method also includes transmitting the document insights to the user device causing a graphical user interface to display the document insights on the user device.

18 Claims, 8 Drawing Sheets

(56) References Cited

U.S. PATENT DOCUMENTS

| | | |
|---|---|---|
| 2020/0279105 A1 | 9/2020 | Muffat et al. |
| 2021/0056510 A1* | 2/2021 | Raghavan et al. |
| 2021/0117417 A1* | 4/2021 | Hendrickson ........... G06F 16/90 |
| 2021/0201412 A1* | 7/2021 | Goh ....................... G06Q 40/02 |
| 2022/0100772 A1* | 3/2022 | Kadarundalagi Raghura .............. G06F 21/6218 |
| 2023/0153382 A1* | 5/2023 | Gullapudi ................ G06N 7/01 382/159 |

OTHER PUBLICATIONS

Customers cut document processing time and costs with DocAI solutions, now generally available. Source 1: <https://cloud.google.com/document-ai/docs/reference/rest/v1beta3/Document> cs/reference/rest/v1beta3/Document <https://cloud.google.com/document-ai/docs/reference/rest/v1beta3/Document>, Date of Publication/Downloading: Oct. 26, 2021, Publisher(s)/Author(s): Google. Source 2: <https://cloud.google.com/document-ai>, Date of Publication/Downloading: Oct. 16, 2021, Publisher(s)/Author(s): Google.
International Preliminary Report on Patentability for Application No. PCT/US2022/080931, mailed Jun. 27, 2024, 12 pages.

\* cited by examiner

HUMAN-AUGMENTED ARTIFICIAL INTELLIGENCE CONFIGURATION AND OPTIMIZATION INSIGHTS

CROSS REFERENCE TO RELATED APPLICATIONS

This U.S. Patent Application claims priority under 35 U.S.C. § 119 (e) to U.S. Provisional Application 63/290,332, filed on Dec. 16, 2021. The disclosure of this prior application is considered part of the disclosure of this application and is hereby incorporated by reference in its entirety.

TECHNICAL FIELD

This disclosure relates to augmenting artificial intelligence configuration and optimization insights.

BACKGROUND

Machine learning models are often used to make predictions about information contained in a set of documents to automate document processing workflows. For instance, a machine learning model may predict an entity like the date of birth for each contract in a set of contracts. Oftentimes, machine learning models generate low-quality or inaccurate predictions. Therefore, machine learning models integrate a human in the loop (HITL) feature that allows users to generate user predictions for some of the documents that the machine learning model is unable to accurately predict in order to ensure the targeted quality for the overall document processing workflow. However, an administrator of the document processing workflow is generally unaware of how exactly to configure the HITL process to achieve the targeted quality as well as how many users to employ for the HITL feature.

SUMMARY

One aspect of the disclosure provides a computer-implemented method that when executed on data processing hardware causes the data processing hardware to perform operations for generating document processing insights for a corpus of documents. The operations include receiving a document insight request that requests document insights for a corpus of documents from a user device associated with a user. The document insight request includes the corpus of documents, a set of entities contained within each document of the corpus of documents, and document insight request parameters that include a confidence threshold value. The operations also include obtaining a machine learning model based on the corpus of documents. Here, the machine learning model is trained on a training corpus of documents that contain the set of entities. The operations also include generating, using the machine learning model, the document insights for the corpus of documents based on the document insight request parameters. The documents insights for the corpus of documents include an accuracy target that indicates a ratio of correctly identified entities from the corpus of documents and a user review rate target that corresponds to the accuracy target. The operations also include transmitting the document insights to the user device. When the user device receives the document insights it causes a graphical user interface (GUI) executing on the user device to display the document insights on a display screen of the user device.

Implementations of the disclosure may include one or more of the following optional features. In some implementations, the document insights for the corpus of documents includes, for each entity of the set of entities, an entity-level accuracy target that indicates a ratio of correctly identified entities for the respective entity and an entity-level user review rate target that corresponds to the entity-level accuracy target. In some examples, the operations further include extracting target features from the corpus of documents that correspond to the set of entities and are suitable for input to the machine learning model. Here, the machine learning model is configured to receive the set of extracted target features as input and generate the document insights for the corpus of documents as output.

The document insight request parameters may include at least one of a confidence value threshold, a user review rate threshold, or an accuracy threshold. In some implementations, the confidence value threshold includes an entity-level confidence value threshold for each entity of the set of entities, the user review rate threshold includes an entity-level user review rate threshold for each entity of the set of entities, and the accuracy threshold includes an entity-level accuracy threshold for each entity of the set of entities. The operations may further include determining, using the machine learning model, confidence values for the set of entities based on the training corpus of documents and comparing the confidence values to the confidence value threshold to generate the user review rate target. Here, the user review rate target indicates a ratio of documents in the corpus of documents that have a confidence value that fails to satisfy the confidence value threshold.

In some examples, the machine learning model generates an entity-level accuracy target by comparing an accuracy estimate for the set of entities from the training corpus of documents based on the confidence value threshold and the user review rate target. Optionally, the operation may further comprise receiving an accuracy threshold for the corpus of documents to generate a confidence value target and a user review rate target. Here, the confidence value target and the user review rate target are needed to satisfy the accuracy threshold for the corpus of documents. In some implementations, the operations further include receiving a user input adjusting the confidence value threshold and, in response to receiving the user input, updating the confidence value target and the user review rate target to satisfy the adjusted confidence value threshold for the corpus of documents.

In some examples, the operations further include receiving a user review rate threshold for the corpus of documents to generate a confidence value target and an accuracy target. In these examples, the confidence value target and the accuracy target are needed to satisfy the accuracy threshold for the corpus of documents. The document insight request may further include a document type indicator specifying a document type for the corpus of documents. Here, obtaining the machine learning model further includes selecting the machine learning model from a plurality of machine learning models based on the document type indicator.

Another aspect of the disclosure provides a system that includes data processing hardware and memory hardware storing instructions that when executed on the data processing hardware causes the data processing hardware to perform operations. The operations include receiving a document insight request that requests document insights for a corpus of documents from a user device associated with a user. The document insight request includes the corpus of documents, a set of entities contained within each document of the corpus of documents, and document insight request parameters that include a confidence threshold value. The operations also include obtaining a machine learning model based on the corpus of documents. Here, the machine learning model is trained on a training corpus of documents that contain the set of entities. The operations also include generating, using the machine learning model, the document insights for the corpus of documents based on the document insight request parameters. The documents insights for the corpus of documents include an accuracy target that indicates a ratio of correctly identified entities from the corpus of documents and a user review rate target that corresponds to the accuracy target. The operations also include transmitting the document insights to the user device. When the user device receives the document insights it causes a graphical user interface (GUI) executing on the user device to display the document insights on a display screen of the user device.

Implementations of the disclosure may include one or more of the following optional features. In some implementations, the document insights for the corpus of documents includes, for each entity of the set of entities, an entity-level accuracy target that indicates a ratio of correctly identified entities for the respective entity and an entity-level user review rate target that corresponds to the entity-level accuracy target. In some examples, the operations further include extracting target features from the corpus of documents that correspond to the set of entities and are suitable for input to the machine learning model Here, the machine learning model is configured to receive the set of extracted target features as input and generate the document insights for the corpus of documents as output.

The document insight request parameters may include at least one of a confidence value threshold, a user review rate threshold, or an accuracy threshold. In some implementations, the confidence value threshold includes an entity-level confidence value threshold for each entity of the set of entities, the user review rate threshold includes an entity-level user review rate threshold for each entity of the set of entities, and the accuracy threshold includes an entity-level accuracy threshold for each entity of the set of entities. The operations may further include determining, using the machine learning model, confidence values for the set of entities based on the training corpus of documents and comparing the confidence values to the confidence value threshold to generate the user review rate target. Here, the user review rate target indicates a ratio of documents in the corpus of documents that have a confidence value that fails to satisfy the confidence value threshold.

In some examples, the machine learning model generates an entity-level accuracy target by comparing an accuracy estimate for the set of entities from the training corpus of documents based on the confidence value threshold and the user review rate target. Optionally, the operation may further comprise receiving an accuracy threshold for the corpus of documents to generate a confidence value target and a user review rate target. Here, the confidence value target and the user review rate target are needed to satisfy the accuracy threshold for the corpus of documents. In some implementations, the operations further include receiving a user input adjusting the confidence value threshold and, in response to receiving the user input, updating the confidence value target and the user review rate target to satisfy the adjusted confidence value threshold for the corpus of documents.

In some examples, the operations further include receiving a user review rate threshold for the corpus of documents to generate a confidence value target and an accuracy target. In these examples, the confidence value target and the accuracy target are needed to satisfy the accuracy threshold for the corpus of documents. The document insight request may further include a document type indicator specifying a document type for the corpus of documents. Here, obtaining the machine learning model further includes selecting the machine learning model from a plurality of machine learning models based on the document type indicator.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
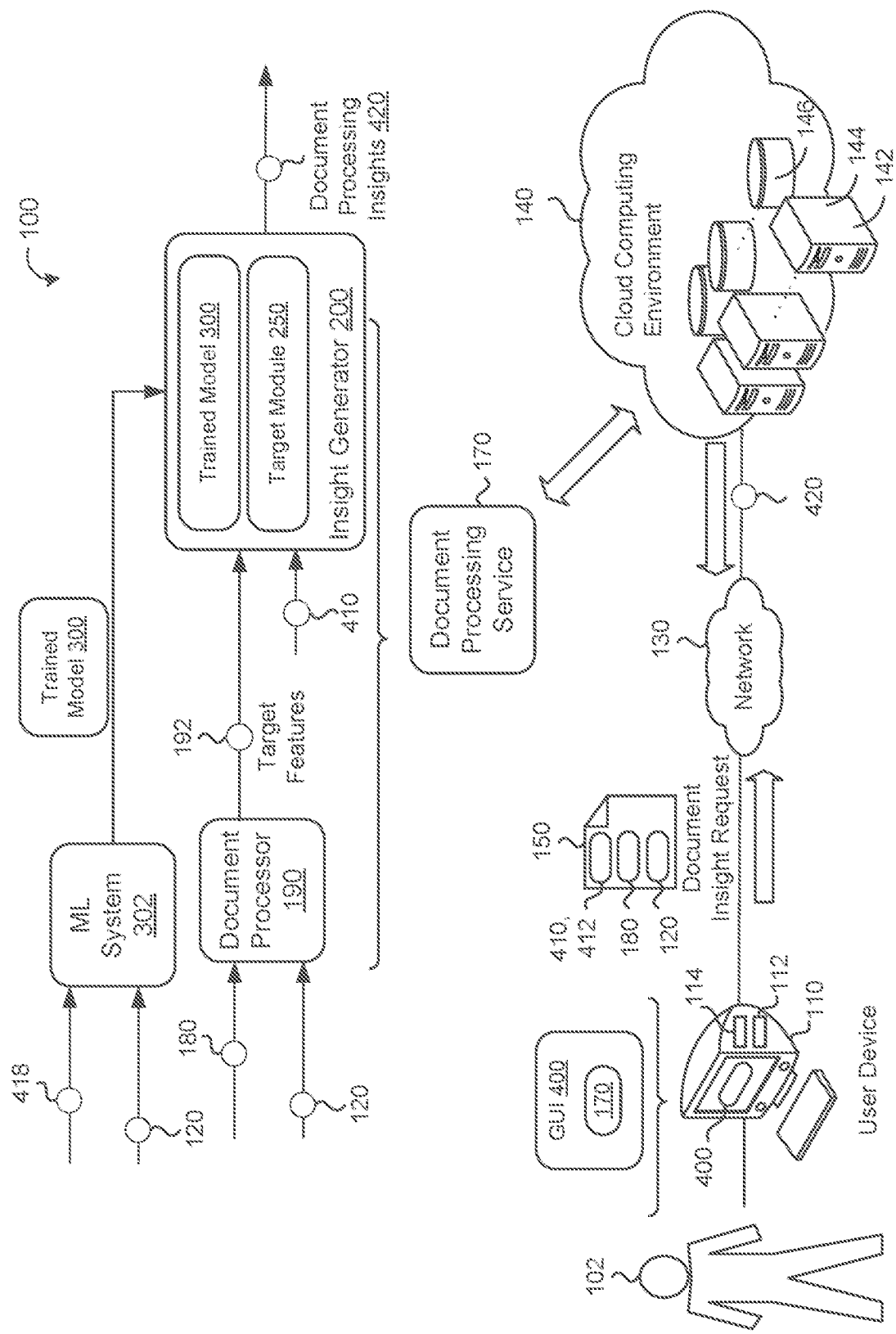
FIG. 1 is a schematic view of an example system for generating document processing insights for a corpus of documents.

Machine learning models have become increasingly popular for automating enterprise document processing services. For example, the machine learning models may perform splitting/classification or extraction (e.g., total quantity, live items from an invoice, etc.) on documents and make predictions for the information contained within a document. Document classification, splitting, and data extraction typically require a high level of accuracy that is hardly achieved by machine learning models (e.g., artificial intelligence (AI)) without human assistance. For example, customers in the financial services industry require that the accuracy of any data extraction system be at least 90% to be helpful and valuable, with some customers requiring as high as 98% accuracy. However, automated document processing systems based on machine learning models cannot achieve such accuracy for most document types. As a result, document processing services introduce a Human In The Loop (HITL) feature that allows humans (e.g., users) to review model predictions that have a relatively low confidence value (e.g., are not likely enough to be accurate). As such, the machine learning models process documents that have a high confidence (e.g., likely to be accurate) and users manually review documents having a low confidence prediction, thereby leading to a higher overall accuracy that is acceptable to customers of the automated document processing service.

HITL is a critical component of automated document processing services, but it is also the main operational cost of these services That is, the document processing servicer must employ a sufficient number of employees that can handle the user review process for low confidence predictions. However, merely flagging predictions that fail to satisfy a certain confidence threshold value does not provide an administrator of the document processing servicer with insights as to how many employees are required. Thus, an administrator may over or under employ workers resulting in inefficiencies or deficiencies in manpower.

Implementations herein are directed towards methods and systems for providing optimization insights (e.g., document insights) based on document insight request parameters. In particular, a machine learning model may receive a confidence value threshold for a corpus of documents as input, and generate a target accuracy and a target user review rate as output. Here, the target accuracy and the target user review rate indicate to an administrator of the automated document processing system a predicted accuracy rate and user review rate required based on the user specified confidence value threshold. Moreover, a user of the system (e.g., an administrator) may adjust the confidence value threshold to achieve a target accuracy and a target user review for any particular application requirements. In some implementations, the machine learning model receives a user review rate threshold for a corpus of documents as input and generates a corresponding confidence value target and an accuracy target as output. In other implementations, the machine learning model receives an accuracy threshold for a corpus of documents as input and generates a target confidence threshold and a target user review rate as output.

While examples herein consider machine learning models for generating document processing insights, it is understood that the methods and systems may also apply to any machine learning system that includes a HITL feature. That is, the methods and systems are applicable to any machine learning model that receives data (e.g., audio, video, images, etc.) and generates or outputs predictions when a confidence value satisfies a confidence threshold (e.g., without user intervention) or requires user intervention when the confidence value fails to satisfy the confidence threshold. For example, an automated processing system may receive an insight request that includes a corpus of audio data, a set of entities within the audio data (e.g., words or phrases), and an insight request parameter (i.e., confidence value target, accuracy target, or user review rate target). Here, the automated processing system obtains a machine learning model based on the corpus of audio data and generates insights for the corpus of audio files for the other of the confidence value target, the accuracy target, and the user review rate target. Accordingly, the methods and systems described herein may generate confidence value targets, accuracy targets, and/or user review rate targets for any machine learning model that includes a HITL feature.

Referring to FIG. 1, in some implementations, an example system 100 includes one or more user devices 110 each associated with a respective user 102 (e.g., administrator or document review personnel), and in communication with a cloud computing environment 140 via a network 130. The cloud computing environment may be a distributed system (e.g., cloud environment) having scalable/elastic resources 142. The resources 142 include computing resources (e.g., data processing hardware) 144 and/or storage resources (e.g., memory hardware) 146. The cloud computing environment 140 executes a document processing service 170 for automatically obtaining a machine learning model 300 and using the machine learning model 300 to generate document processing insights (e.g., document insights) 420 for the corpus of documents 180 the user 102 is processing. The document processing service 170 is configured to automatically obtain (e.g., automatically generate) the machine learning model 300 without input from the user 102 except for the document insight request 150.

Each user device 110 may correspond to a computing device such as a mobile phone, computer, wearable device, smart appliance, audio infotainment system, smart speaker, etc., and is equipped with data processing hardware 112 and memory hardware 114. The user device 110 may execute (e.g., via the data processing hardware 112) a graphical user interface (GUI) 400 that displays on a screen of the user device 110. The user 102 may use the GUI 400 to manage to document processing service 170 and/or to manually review individual documents (e.g., documents identified by the machine learning model 300 for user 102 review) from the corpus of documents 180. For instance, the user 102 may input document insight request parameters 410 (also referred to as request parameters 410) to the user device 110 via the GUI 400. The user 102 may use the GUI 400 to communicate with the document processing service 170, e.g., to send a document insight request 150 to the document processing service 170, display document insights 420 generated by the document processing service 170, and/or otherwise interact with the document processing service 170.

In the example shown, the document processing service 170 receives a document insight request 150 requesting document insights 420 for a corpus of documents 180 that the user 102 wants to process. The corpus of documents 180 may include one or more documents that the user 102 is seeking to gain insights on, e.g., via the document processing insight 420 (interchangeably referred to as document insights 420). As used herein, the corpus of documents 180 may include any number or type of documents such as, without limitation, invoices, receipts, loan applications, job applications, service level agreements, contracts, health records, etc. As such, the term document is used generally, and may represent any sort of digital file.

The document insight request 150 includes or identifies at least one of a corpus of documents 180, a set of entities 120, and the document insight request parameters 410 (also referred to herein as simply "request parameters 410"). Optionally, the request parameters 410 may include the set of entities 120. The set of entities 120 are contained within the corpus of documents 180 and each entity 120 refers to information (e.g., words, phrases, images, names, dates, numbers, etc.) contained within the corpus of documents 180. For example, a corpus of documents 180 of contracts may include an entity 120 for each of start dates, end dates, renewal conditions, parties involved, contract type, or venue (collectively referred as the set of entities 120) contained within the contracts. In another example, a corpus of documents 180 of health records may include an entity 120 for each of a date of birth, patient number, vaccine name, clinic site, first and last name, middle initial, etc. contained with the health records. In some instances, not every document in the corpus of documents 180 contains every entity 120 from the set of entities 120.

Figure 4:
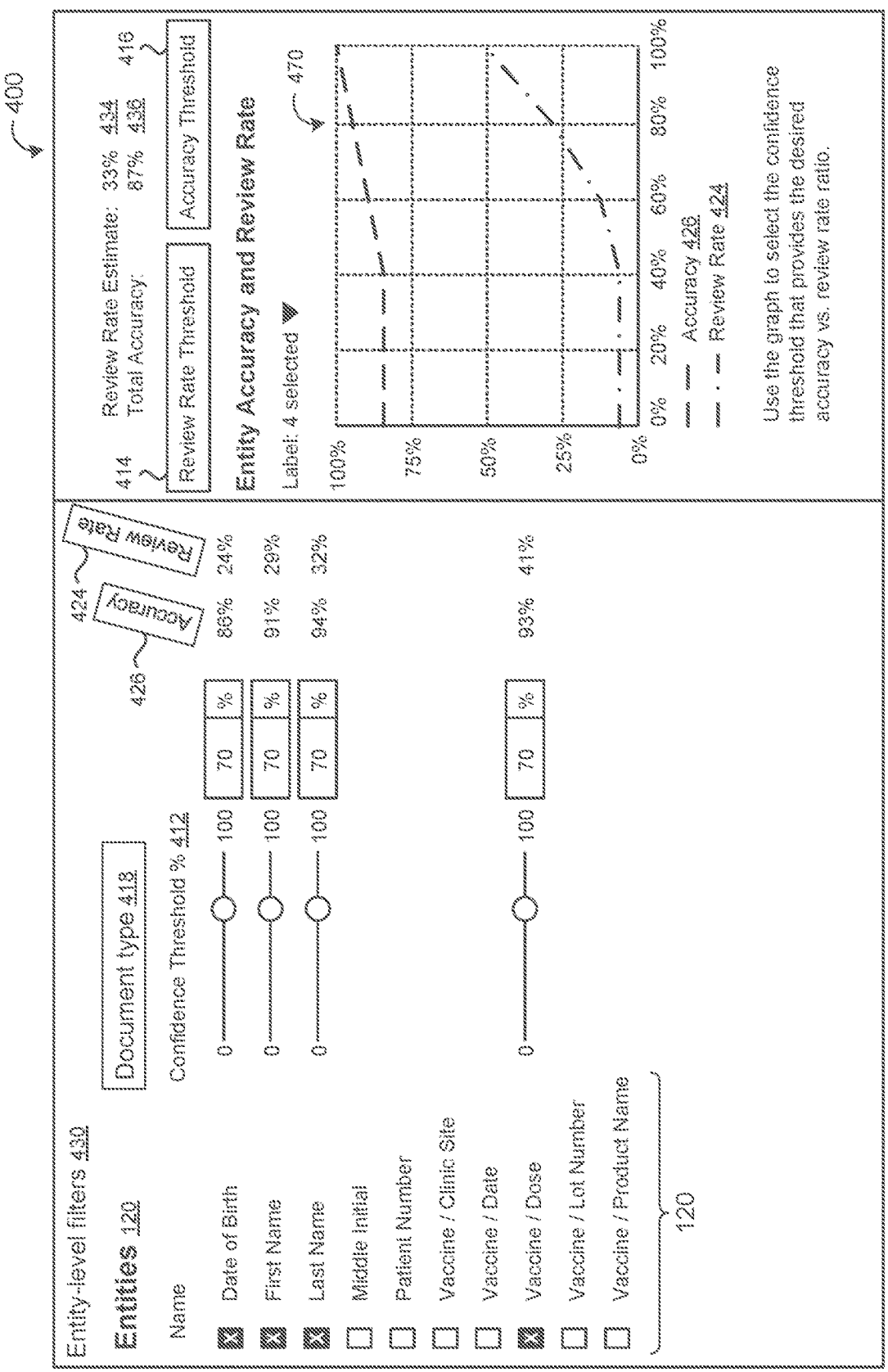
FIG. 4 is a schematic view of an example graphical user interface.

In some examples, the set of entities 120 in the document request 150 only includes a subset of entities 120 from the set of entities 120. In particular, a user 102 may only be interested in receiving document insights 420 for four (4) particular entities contained within a corpus of documents 180 that includes a set of ten (10) entities 120 (FIG. 4). Here, the user 102 indicates to the document processing service 170 the four (4) entities 120 of interest to generate document insights 420 for through the document insight request 150.

In some implementations, the document processing service 170 executing on the cloud computing environment 140 (e.g., executing on the data processing hardware 144) includes a document processor 190, a machine learning (ML) system 302, and an insight generator 200. In the example shown, the document processing service 170 executes entirely on the cloud computing environment 140, however, the document processing service 170 may also execute on the cloud computing environment 140, the user device 110, or some combination thereof.

The document processor 190 is configured to extract a set of target features 192 from the corpus of documents 180 included in the document insight request 150. Here, the set of target features 192 correspond to the set of entities 120 included in the document insight request 150. For example, where the set of entities 120 refers to a first name, last name, and date of birth for the corpus of documents 180, the document processor 190 extracts this information from the corpus of documents 180 into target features 192. Here, the target features 192 include a syntactic representation that corresponds to the set of entities 120 extracted from the corpus of documents 180 that are suitable for input to the machine learning model 300. For instance, the use of the target features 192 to syntactically represent the corpus of documents 180 can represent the corpus of documents 180 in a format that is readable by the machine learning model 300 and reduce memory requirements of the machine learning model 300 by removing unnecessary data from the corpus of documents 180 (e.g., entities 120 that are contained within the corpus of documents 180 but not specified within the document insight request 150). However, in other examples, the document processing service 170 may omit the document processor 190 and instead generate the document insights 420 when the corpus of documents 180 are directly input to the machine learning model 300.

In some implementations, the ML system 302 is configured to obtain the machine learning model 300 (or ensemble of models) based on the corpus of documents 180 included in the document insight request 150. That is, the ML system 302 may have access to a plurality of machine learning models 300 each configured to generate document insights 420 for different types of documents and/or different entities 120. For example, a first machine learning model 300 may be trained to generate document insights 420 for invoice documents while a second machine learning model 300 is trained to generate document insights 420 for job application documents. In this example, when the corpus of documents 180 includes job applications, the ML system 302 selects the second machine learning model 300 to generate the document insights 420. The ML system 302 may determine which machine learning model 300 to obtain by processing the corpus of documents 180 directly to determine a document type of the corpus of documents 180. Optionally, the request parameters 410 of the document insight request 150 includes a document type indicator 418 and the ML system 302 obtains the machine learning model 300 using the document type indicator 418. In some implementations, the document processing service 170 may omit the ML system 302 and execute a single machine learning model 300 trained to generate document insights 420 for any document type or set of entities 120.

After the ML system 302 obtains the machine learning model 300 responsive to receiving the document insight request 150 from the user device 110, the insight generator 200 is configured to generate the document processing insights 420 for the corpus of documents 180 using the machine learning model 300. In some examples, the insight generator 200 receives the set of target features 192 extracted from the corpus of documents 180 and the request parameters 410 as inputs to the machine learning model 300 and generates the document insights 420 for the corpus of documents 180 as an output.

Figure 2A:
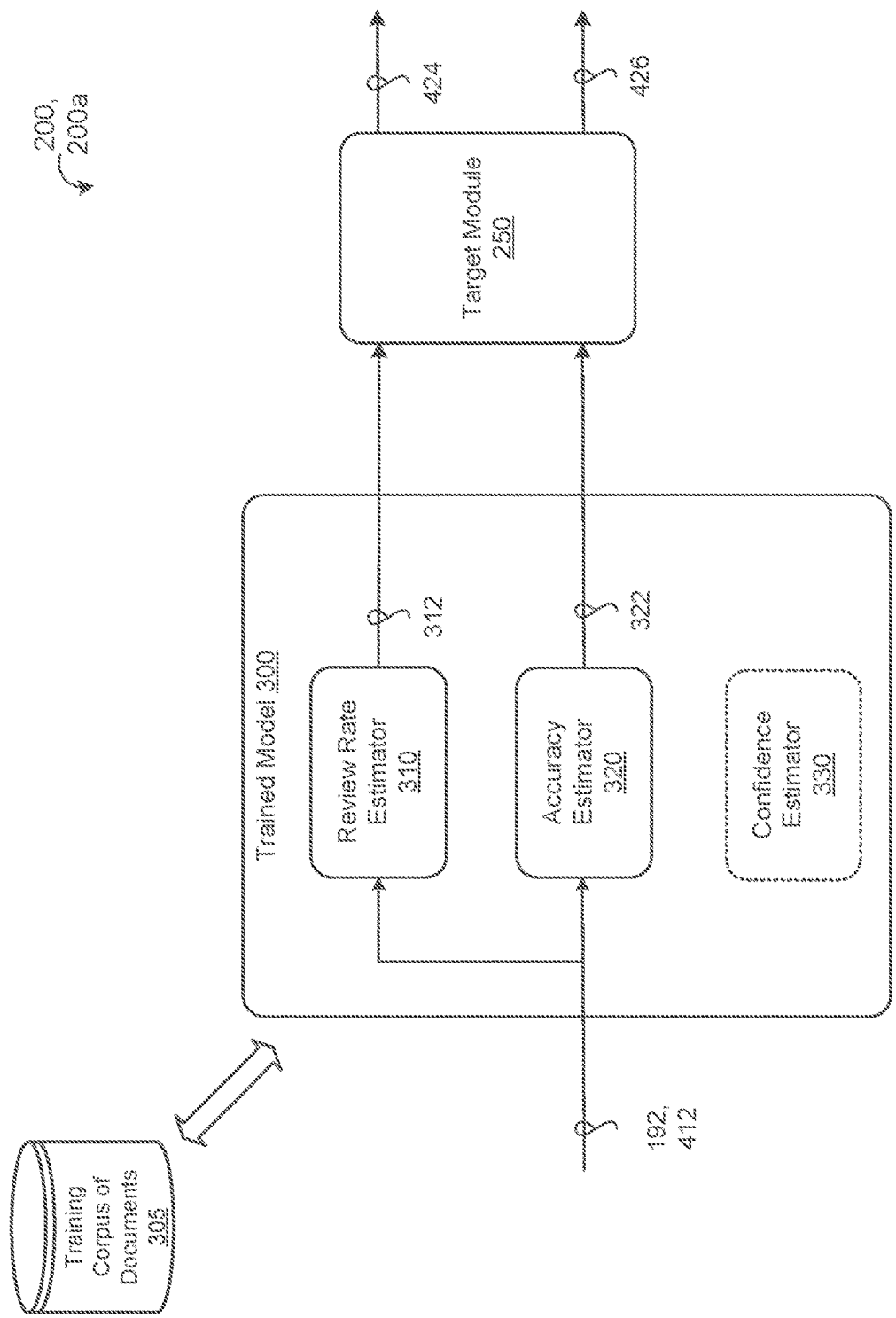
FIGS. 2A-2C are schematic views of a machine learning model generates document processing insights based on document request parameters.
Figure 2B:
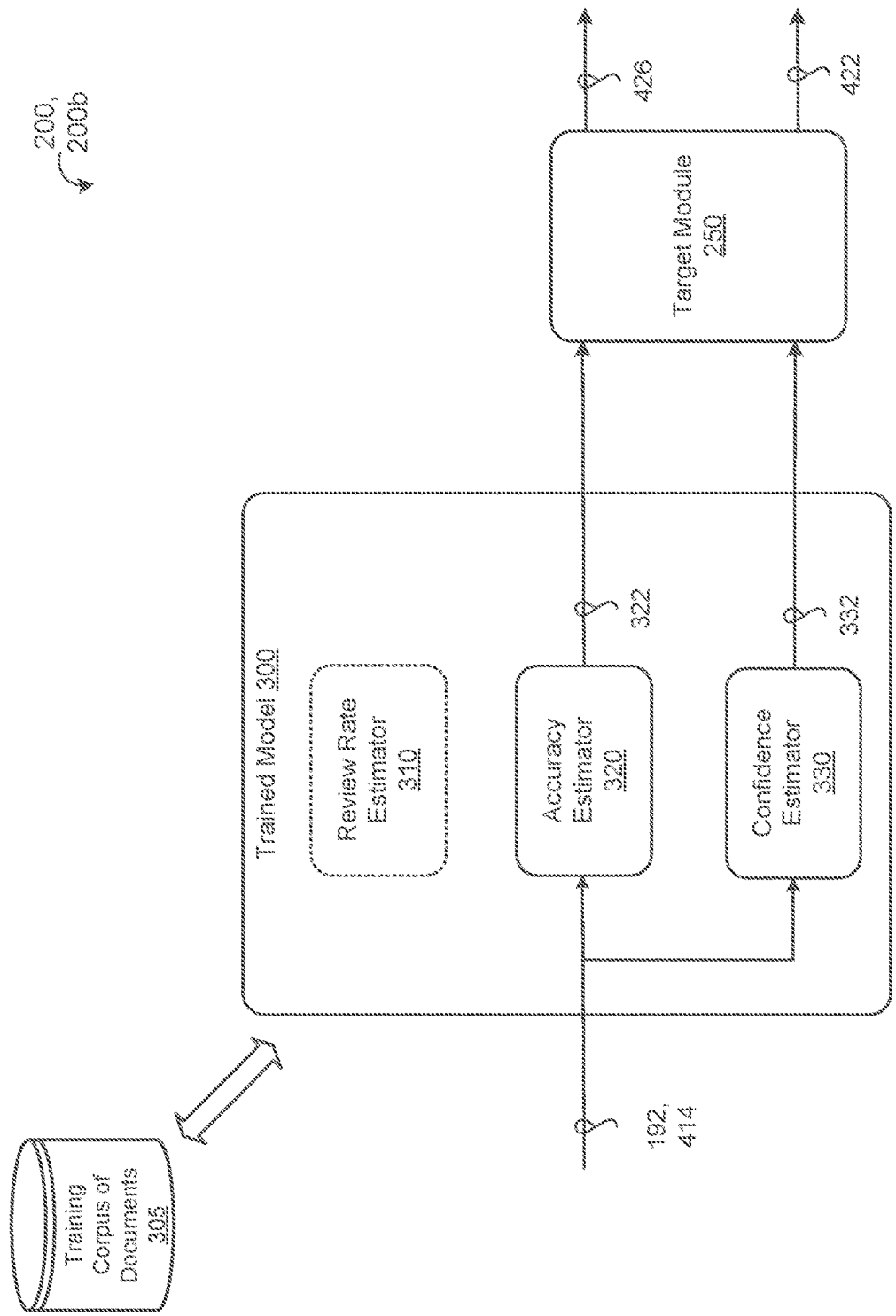
Figure 2C:
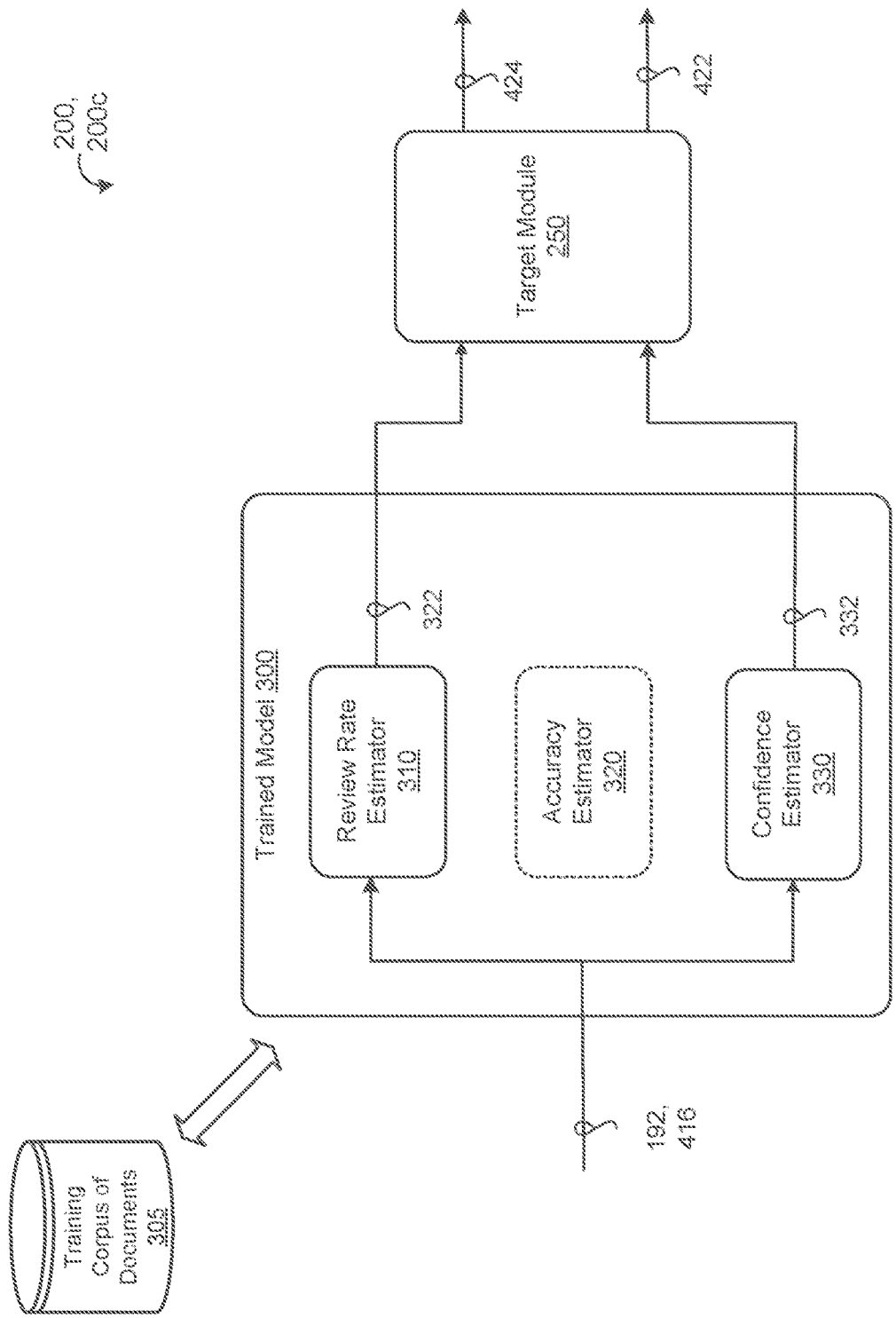

The request parameters 410 may include at least one of an input confidence value target 412, a input review rate target 414, an input accuracy target 416 (as shown in FIGS. 2A-2C). In particular, the document processing service 170 may receive request parameters 410 that include the input confidence value target 412, the input review rate target 414, the input accuracy target 416, the document type indicator 418, or any combination thereof, as described in greater detail with reference to FIGS. 2A-2C.

The input confidence value target 412 indicates to the machine learning model 300 when the user 102 needs to review a prediction the machine learning model 300 generates That is, during inference the machine learning model 300 is configured to generate a predicted confidence value for each entity 120 contained within a document. For example, the machine learning model 300 may predict the first name on a loan application is "John." The machine learning model 300 also generates a corresponding confidence value that indicates a probability that the prediction is correct. Continuing with the example, the machine learning model 300 generates a 0.95 confidence value that "John" is the actual first name on the loan application. In some scenarios, the machine learning model 300 generates predictions with a high confidence value such that user 102 review of these predictions is duplicative or otherwise inefficient. In other scenarios, the machine learning model 300 generates predictions with a low confidence value, and thus, indicates that the machine learning model 300 prediction is more likely to be incorrect.

Accordingly, the user 102 specifies the input confidence value target 412 in the request parameters 410 to indicate whether the machine learning model 300 needs to identify a prediction for user 102 review. In particular, when a confidence value satisfies the input confidence value target 412, the machine learning model 300 outputs the prediction without any user 102 review. Alternatively, when a confidence value fails to satisfy the input confidence value target 412 the machine learning model 300 tags the prediction for user review Here, the document processing service 170 sends the prediction that fails to satisfy the input confidence value target 412 to the GUI 400 and the GUI 400 displays the corresponding document to the user 102. As such, the user 102 manually inspects the contents of the document and inputs value of the entity 120 manually (e.g., the user 102 inputs that the first name on the loan application is "John"). This user 102 input is also referred to as a user prediction Notably, by employing the input confidence value target 412 the document processing service 170 is able to retain automation for predictions with a high confidence value while also maintaining acceptable accuracy levels by integrating user 102 review.

Using the input confidence value target 412 alone, however, does not inform the user 102 of the document processing service 170 a frequency in which confidence values of predictions will fail to satisfy a threshold value (e.g., how often will user 102 review be needed). Moreover, using the input confidence value target 412 alone does not provide the user 102 with an overall accuracy rate that considers both the user 102 predictions and machine learning model 300 predictions. Accordingly, the insight generator 200 generates document processing insights 420 to provide these insights to the user 102 using the machine learning model 300. In particular, the document insights 420 may include at least one of an output accuracy target 426 (FIG. 2A) that indicates a ratio of correctly identified entities 120 from the corpus of documents 180, an output review rate target 424 (FIG. 2A), and/or an output confidence value target 422. In the example shown, the insight generator 200 receives request parameters 410 specified by the user 102 in the document insight request 150 and generates document processing insights 420 corresponding to the document insight request 150.

As shown in FIG. 1, the insight generator 200 includes a target module 250 and the machine learning model 300. Alternatively, the machine learning model 300 may include the target module 250. The machine learning model 300 may include a review rate estimator 310, an accuracy estimator 320, and/or a confidence value estimator 330 to generate the document insights 420 (e.g., output confidence value target 422, output review rate target 424, and output accuracy target 426). In some examples, the machine learning model receives target features 192 and entity-level request parameters 410 and generates entity-level document insights 420. For example, the machine learning model 300 may receive entity-level request parameters 410 for a total dollar amount in invoice documents and generates entity-level document insights 420 for the total dollar amount entity 120 only. Notably, each entity 120 in the corpus of documents 180 may include different entity-level request parameters 410 and the machine learning model 300 may generate corresponding entity-level document insights 420. In other examples, the machine learning model 300 receives request parameters 410 for the entire document (e.g., all entities 120) and generates document insights 420 for the entire document.

Referring now to FIG. 2A, in some implementations, an example insight generator 200, 200a includes the machine learning model 300 receiving document request parameters 410 that indicate a input confidence value target 412 and the target features 192 associated with the corpus of documents 180. In the example shown, the confidence estimator 330 is not used (denoted by the dotted lines) because the input confidence value target 412 is already provided by the user 102.

In this scenario, the user 102 is seeking document insights 420 that include the output accuracy target 426 and the output review rate target 424. Accordingly, the review rate estimator 310 generates a review rate estimate 312 based on the training corpus of documents 305. Here, the training corpus of documents 305 used to train the machine learning model 300 include the same or sufficiently similar entities 120 specified by the document request 150. Thus, the machine learning model 300 is trained to accurately predict values for the insight request 150. For example, the target feature 192 may correspond to an entity 120 for a total balance associated with a corpus of invoice documents. In this example, the review rate estimator 310 generates the review rate estimate 312 based on a predicted ratio of total balance predictions for invoice documents that fail to satisfy the input confidence value target 412. The review rate estimator 310 determines the ratio based on training corpus of documents 305 (e.g., on average how many similar predictions failed to satisfy the input confidence value target 412 in the training corpus of documents 305) In particular, the review rate estimate 312 is a predicted ratio that indicates a percentage of documents that the machine learning model 300 will flag for user 102 review.

For example, the input confidence value target 412 may indicate a 70% input confidence value target 412 such that the machine learning model 300 identifies any predictions with a confidence value less than 70% for user 102 review. Moreover, the machine learning model 300 outputs any predictions with a confidence value greater than 70% without any user 102 review Thus, the review rate estimator 310 may determine that 20% of the predictions that the machine learning model 300 generates will fail to satisfy the input confidence value target 412 and generate a review rate estimate 312 of 20%. The machine learning model 300 provides the review rate estimate 312 to a target module 250 of the insight generator 200.

Continuing with the example shown in FIG. 2A, the accuracy estimator 320 receives the input confidence value target 412 and the target features 192 as inputs and generates a model prediction accuracy estimate 322 as an output. In particular, accuracy estimator 320 determines the model prediction accuracy estimate 322 based on the prior training corpus of documents 305 and the input confidence value target 412 for the target features 192. As discussed below, the output accuracy target 426 (output by the target module 250) represents the overall accuracy between user predictions and machine learning model 300 predictions. In some examples, the output accuracy target 426 represents an F1 score (e.g., an accuracy of a model for a dataset). Thus, the output accuracy target 426 is dependent upon the review rate estimate 312 and the model prediction accuracy estimate 322. For example, the machine learning model 300 may estimate that documents that are processed using the machine learning model 300 have an accuracy rate of 70% while documents that are manually reviewed are 100% accurate, such that the greater the review rate estimate 312 is, the greater the overall output accuracy target 426 will be. Simply put, the output accuracy target 426 directly correlates with how many predictions the user 102 reviews. Accordingly, the accuracy estimator 320 generates the model prediction accuracy estimate 322 over all possible review rate estimates 312. Thus, the model prediction accuracy estimate 322 may include a vector of accuracy estimates over the possible review rate estimates 312.

The target module 250 receives the review rate estimate 312 and the model prediction accuracy estimate 322 as inputs and generates the output review rate target 424 and output accuracy target 426 as output. Here, the target module 250 may simply output the output review rate target 424 as a value equal to the review rate estimate 312 because the output review rate target 424 does not depend on the model prediction accuracy estimate 322. In some examples, the target module 250 compares the model prediction accuracy estimate 322 to the review rate estimate 312 to generate the output accuracy target 426. That is, for user 102 predictions the target module 250 may assume that the user 102 predictions are 100% correct. As such, as the output review rate target 424 (e.g., as the number of user predictions) increases so does the output accuracy target 426 because the user predictions are always (or almost always) correct. In other examples, the target module 250 receives a configurable accuracy rate for user predictions (e.g., any integer from 0 to 100). The target module 250 may generate the output accuracy target 426 by the following representation:

$$T_a = (U * U_a) + (M * M_a) \quad (1)$$

In Equation 1, $T_a$ represents the output accuracy target 426, U represents the review rate estimate 312, $U_a$ represents an accuracy rate of user predictions (any configurable percentage value between 0 and 100), M represents a machine learning model 300 review rate (e.g., 1 minus the user rate review estimate 312), and $M_a$ represents the model prediction accuracy estimate 322 over all possible rate review estimates 312. Thus, the target module 250 selects an model prediction accuracy estimate 322 for the corresponding review rate estimate and generates the output accuracy target 426 using Equation 1.

The target module 250 provides the output review rate target 424 and the output accuracy target 426 to the GUI 400 for display to the user 102. Accordingly, the user output review rate target 424 and the output accuracy target 426 (collectively referred to as document insights 420) provide actionable insights to the user 102 that represent (i) an amount of manual review by the user 102 required to review predictions of the machine learning model 300 and (i) the overall accuracy of predictions based on the input confidence value target 412.

In some implementations, the target module 250 may generate a review time associated with the user output review rate target 424. That is, in some examples, the machine learning model 300 may indicate a document for user review that includes multiple entities 120 that the machine learning model 300 cannot accurately predict. Documents with multiple entities will increase user review time for the document. In other examples, a prediction for a certain entity 120 may be more complex such as generating a total on a balance sheet document. In these examples, the target module 250 will generate a longer review time for this user prediction. Accordingly, the user prediction time and the output review rate target 424 provide valuable information to a user 102 for processing the corpus of documents 180. Moreover, the machine learning model 300 may indicate documents for user review based on the review time and/or number of entities 120 in addition to, or in lieu of, the confidence values. That is, the machine learning model 300 may indicate documents for review that include multiple entities for to promote efficiencies of the user predictions.

Referring now to FIG. 2B, in some implementations, the user 102 provides a user input review rate target 414 in the request parameters 410 to an example insight generator 200, 200b. Here, the user 102 may staff a limited team of users that perform review of predictions identified by the machine learning model 300 that fail to satisfy the input confidence value target 412. For example, the user 102 may need to know corresponding confidence value targets 422 and accuracy targets 426 that document processing service 170 can achieve with the constrained user review from the limited team of users. The confidence value targets 422 and the accuracy targets 426 inform the user 102 how many user hours are required to desired achieve accuracy levels for certain customers. In the example shown, the review rate estimator 310 is not used (denoted by the dotted lines) because the user input review rate target 414 is provided by the user 102.

In this scenario, the user 102 is seeking document insights 420 that include the output accuracy target 426 and the output confidence value target 422. The confidence estimator 330 is configured to receive the target features 192 and the input review rate target 414 and output a confidence threshold estimate 332. Here, the confidence threshold estimate 332 may include a range of values that achieve the input review rate target 414. As such the confidence estimator 330 generates confidence threshold estimate 332 to include a vector of all possible confidence value thresholds that will satisfy the input review rate target 414. That is, the confidence threshold estimate 332 and model prediction accuracy estimate 322 are dependent on one another. The confidence estimator 330 sends the confidence threshold estimate 332 to the target module 250.

In the example shown, the accuracy estimator 320 receives the user input review rate target 414 and the target features 192 as inputs and generates the model prediction accuracy estimate 322 as an output. In particular, accuracy estimator 320 determines the output accuracy target 426 based on the prior training corpus of documents 305 and the user input review rate target 414 for the target features 192. As discussed below, the output accuracy target 426 represents the overall accuracy between user 102 predictions and machine learning model 300 predictions. Moreover, the output accuracy target 426 is dependent upon the confidence threshold estimate 332. Simply put, when the input confidence value target 412 is high, the machine learning model 300 only outputs predictions that it has a high confidence of being accurate thereby increasing an overall ratio of correct predictions. Accordingly, the accuracy estimator 320 generates the model prediction accuracy estimate 322 over all possible confidence threshold estimates 332. Thus, the model prediction accuracy estimate 322 may include a vector of accuracy estimates over the possible confidence threshold estimates 332.

The target module 250 is configured to receive the model prediction accuracy estimate 322 and the confidence threshold estimate 332 as input, and generates the output confidence value target 422 and the output accuracy target 426 as output to satisfy the input review rate target 414. As such, the target module 250 selects a value from the confidence threshold estimate 332 and the model prediction accuracy estimate 322 to achieve the user input review rate target 414. For example, the target module 250 may determine that selecting a 70% confidence threshold estimate 332 (e.g., the machine learning model 300 only outputs predictions when the accuracy value exceeds 70%) and selecting an model prediction accuracy estimate 322 of 86% percent satisfies the input review rate target 414 provided by the user 102.

Once the target module 250 identifies values that satisfy the input review rate target 414, the target module 250 outputs the corresponding output accuracy target 426 and the output confidence value target 422 (collectively referred to as document insights 420) for display on the GUI 400 for the user 102. Accordingly, the output accuracy target 426 and output confidence value target 422 provide actionable insights to the user 102 of indicating an accuracy that can be achieved for the input review rate target 414.

Referring now to FIG. 2C, in some implementations, the user 102 provides an input accuracy target 416 in the request parameters 410 to an example insight generator 200, 200c. Here, the user 102 may be processing a corpus of documents 180 that require a certain level of accuracy. For example, processing financial documents may require the overall accuracy of predictions between the user 102 and the machine learning model 300 to be 98%. Thus, the user 102 may need to know corresponding confidence targets 422 and review rate targets 424 such that the document processing service 170 can achieve with the input accuracy target 416. In the example shown, the accuracy estimator 320 is not used (denoted by the dotted lines) because the input accuracy target 416 is provided by the user 102.

In this scenario, the user 102 is seeking document insights 420 that include the confidence target 426 and the output review rate target 424. The confidence estimator 330 is configured to receive the target features 192 and the input accuracy target 416 and output a confidence threshold estimate 332. Here, the confidence threshold estimate 332 may include a range of values that achieve the input accuracy target 416. As such, the confidence estimator 330 generates a confidence threshold estimate 332 to include a vector of all possible confidence threshold estimate values. That is, the confidence threshold estimate 332 and review rate estimate 312 are dependent on one another. The confidence estimator 330 sends the confidence threshold estimate 332 to the target module 250.

The review rate estimator 310 is configured to receive the target features 192 and the input accuracy target 416 and output a review rate estimate 312. The review rate estimator 310 generates a review rate estimate 312 to include a vector of all possible review rate estimate values. The review rate estimator 310 sends the review rate estimate 312 to the target module 250.

The target module 250 is configured to select values from the review rate estimate 312 values and the confidence threshold estimate 332 values to satisfy the input accuracy target 416. For example, the target module 250 may determine that a review rate estimate 312 of 20% and a confidence threshold estimate 332 of 75% results in a combined accuracy that satisfies the input accuracy target 416. More specifically, the target module 250 determines that the confidence threshold estimate 332 of 75% results in the 20% user review rate. Moreover, the target module 250 determines, based on the user review rate of 20%, that the document processing service 170 will generate an accuracy (e.g., average accuracy between user predictions and machine learning model 300 predictions) that satisfies the input accuracy target 416. Once the target module 250 selects values that satisfy the input accuracy target 416, the target module 250 generates the output review rate target 424 and the output accuracy target 426. The target module 250 also sends the output review rate target 424 and the output accuracy target 426 to the GUI 400 to display.

Figure 3:
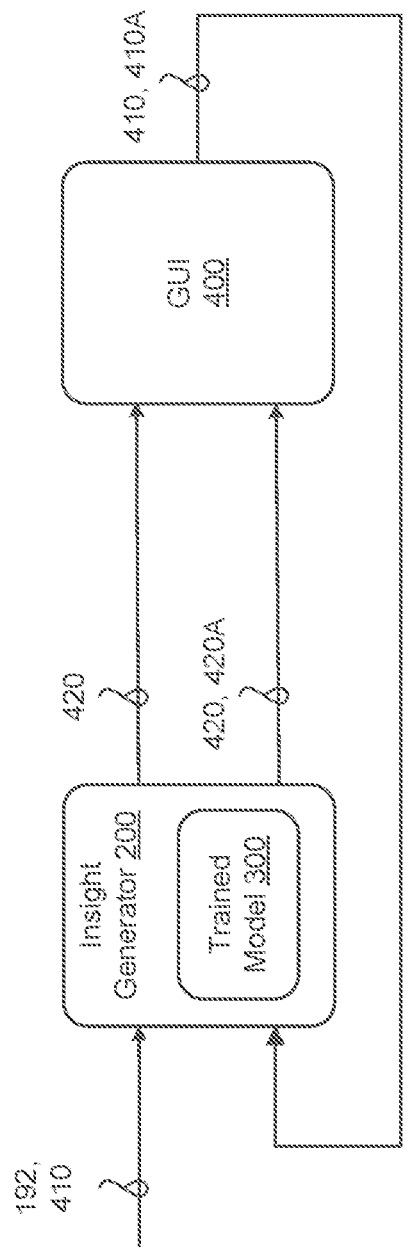
FIG. 3 is a schematic view of a user adjusting document request parameters at the machine learning model via a graphical user interface.

Referring now to FIG. 3, in some implementations, the insight generator 200 receives request parameters 410 (e.g., input confidence value target 412, a input review rate target 414, an input accuracy target 416) and target features 192 and generates document insights 420 to display at the GUI 400. After receiving the document insights 420, the user 102 may adjust one of the request parameters 410. That is, the insight generator 200 may provide the documents insights 420 for display on the user device 110 via the GUI 400. As such, the user 102 may adjust the request parameters 410 based on reviewing the document insights 420. For example, the document insights 420 may include a output review rate target 424 of 50% for an input accuracy target 416 of 98% provided by the user 102. Thus, the user 102 may adjust the input accuracy target 416 (e.g., request parameter 410) and the insight generator 200 receives the adjusted request parameter 410, 410A. Now the insight generator 200, using the machine learning model 300, must re-generate the document insights 420, 420A based on the adjusted request parameter 410A.

FIG. 4 illustrates an illustrative view of an example GUI 400 that allows the user 102 to interact with the insight generator 200. The user 102 may interact with the GUI 400 (and thereby the document processing service 170) executing on the user device 110 via any input method. That is, the user 102 may provide a touch input, a keyboard input, a mouse input, a spoken input, or any other input suitable for the user device 110. As shown in this example, the GUI 400 displays a list of the set of entities 120 associated with the corpus of documents 180. The user 102 may apply one or more entity-level filters 430 by selecting a subset of the entities 120 from the set of entities 120. Here, only the selected subset of entities 120 are included in the document insight request 150 provided to the document processing service 170 to process. In the example shown, the user 102 selected date of birth, first name, last name, and vaccine/dose as the set of entities 120.

In some implementations, the user 102 may select an input confidence value target 412, a input review rate target 414, and/or an input accuracy target 416 as the request parameter 410 of the document request 150. As shown in FIG. 4, the GUI 400 is displaying the input confidence value target 412 option. In the example shown, each input confidence value target 412 is set to 70%, however, the input confidence value target 412 may include any value from 0-100%. As such, the user 102 can input an entity-level input confidence value target 412 for each of selected entities 120. Notably, the GUI 400 allows different entity-level confidence value thresholds 412 for each of the entities 120. Advantageously, the user 102 may set a high entity-level input confidence value target 412 for entities 120 that have a low-fault tolerance and a different, low entity-level input confidence value target 412 for entities 120 that have a higher-fault tolerance. In the illustrated example, the user 102 may specify the entity-level input confidence value target 412 via a sliding scale or by inputting the threshold value into a text box. However, other graphical representations may be presented to the user 102 for adjusting the values, such as rotational elements or the like.

As the user 102 adjusts the confidence value thresholds 412, the document processing service 170 receives the adjusted confidence value thresholds 412 and generates the output accuracy target 426 and the output review rate target 424. Accordingly, the user 102 can manipulate each of the entity-level confidence value thresholds 412 and view the corresponding output accuracy target 426 and output review rate target 424 displayed on the GUI 400. Thus, the user 102 can fine tune the input accuracy target 416 to achieve a target accuracy with a lowest possible user review cost. Moreover, the GUI 400 may average all of the entity-level output accuracy target 426 to generate a total accuracy prediction 436 that represents a total accuracy for all the selected entities 120. The GUI 400 may also average all of the entity-level output review rate target 424 to generate a total review rate prediction 434 that represents a total review rate for the corpus of documents 180.

In some implementations, the GUI 400 generates a graph 470 that illustrates a relationship between the output accuracy target 426 and the output review rate target 424 for a given input confidence value target 412. Here, the user 102 uses the graph to select a input confidence value target 412 that provides a desired output accuracy target 426 versus output review rate target 424. More specifically, the graph 470 visually presents to the user 102 for a given input confidence value target 412, the resulting output accuracy target 426 versus the output review rate target 424. The GUI 400 may generate the graph 470 for any combination of the entities 120 or for the corpus of documents 180 as whole.

Moreover, when the user 102 selects the input review rate target 414, the graph 470 displays an output confidence value target 422 versus the output accuracy target 426 relationship. In other examples, when the user 102 selects the input accuracy target 416, the graph 470 displays the output confidence value target 422 versus the output review rate target 424 relationship. For sake of clarity, only the GUI 400 illustrates the user 102 inputting the input confidence value target 412. Thus, it is understood that similar GUIs 400 may display on the user device 110 for the input review rate target 414 and/or the input accuracy target 416.

Figure 5:
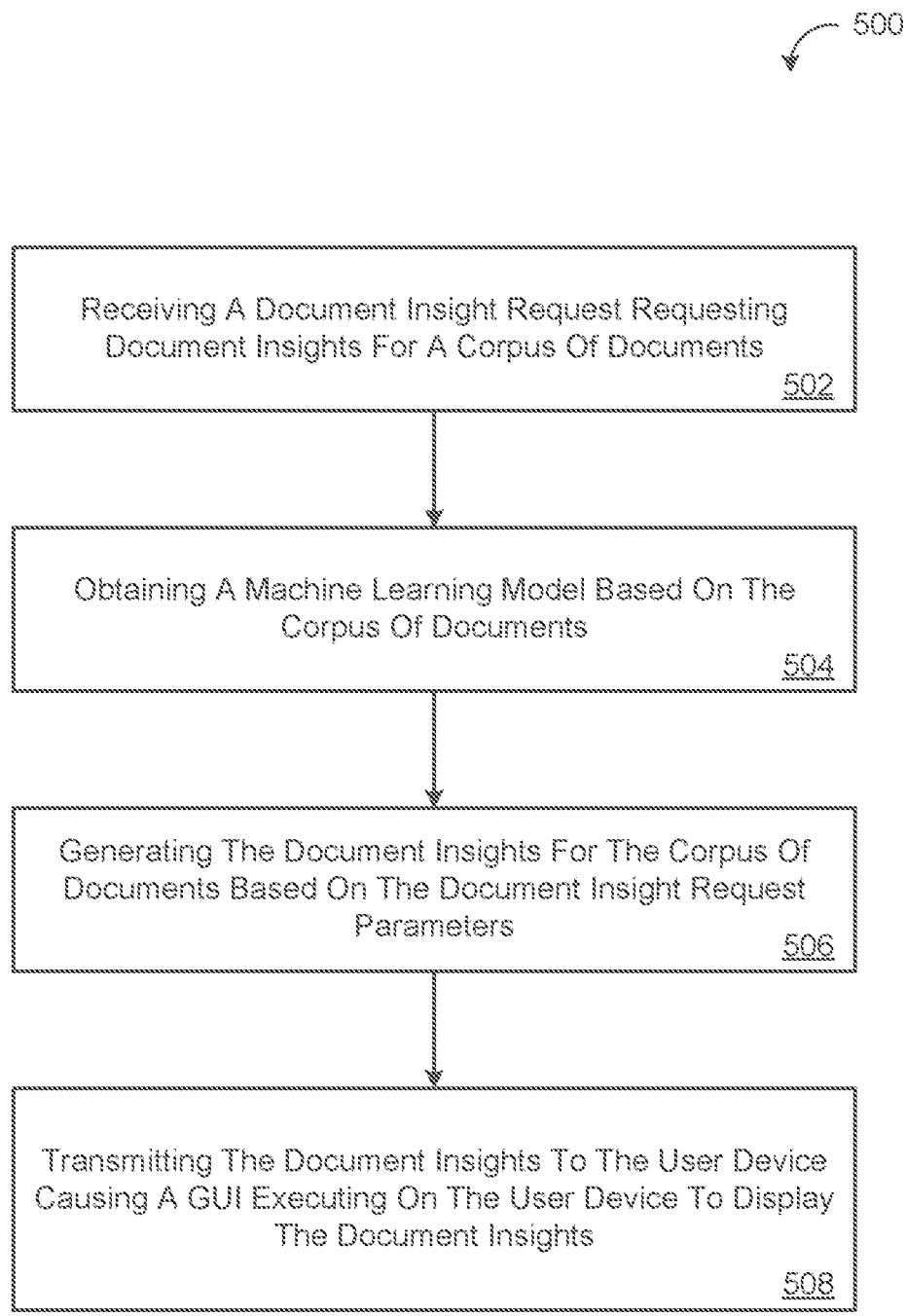
FIG. 5 is an example arrangement of operations for a method of generating document processing insights for a corpus of documents.

FIG. 5 is a flowchart of an example arrangement of operations for a method 500 of generating document processing insights 420 for a corpus of documents 180. At operation 502, the method 500 includes receiving a document insight request 150 that requests document insights 420 for a corpus of documents 180 from a user device 110 associated with a user 102. The document insight request 150 includes the corpus of documents 180, a set of entities 120 contained with each document of the corpus of documents 180, and document insight request parameters 410 that includes a input confidence value target 412. At operation 504, the method 500 includes obtaining a machine learning model 300 based on the corpus of documents 180. Here, the machine learning model 300 is trained on a training corpus of documents containing the set of entities 120 included in the document insight request 150.

At operation 506, the method 500 includes generating, using the machine learning model 300, the document insights 420 for the corpus of documents 180 based on the document insight request parameters 410. In this example, the document insights 420 for the corpus of documents 180 includes an output accuracy target 426 that indicates a ratio of correctly identified entities 120 from the corpus of documents 180. The document insights 420 also include a user output review rate target 424 that corresponds to the output accuracy target 426. That is, during inference of the document processing service 170, the machine learning model 300 will likely generate the user output review rate target 424 and the output accuracy target 426 given the input confidence value target 412 provided by the user 102. At operation 508, the method 500 includes transmitting the document insights 420 to the user device 110. In response to receiving the document insights 420, a graphical user interface (GUI) 400 executing on the user device 110 displays the document insights 420 on a display screen of the user device 110.

Figure 6:
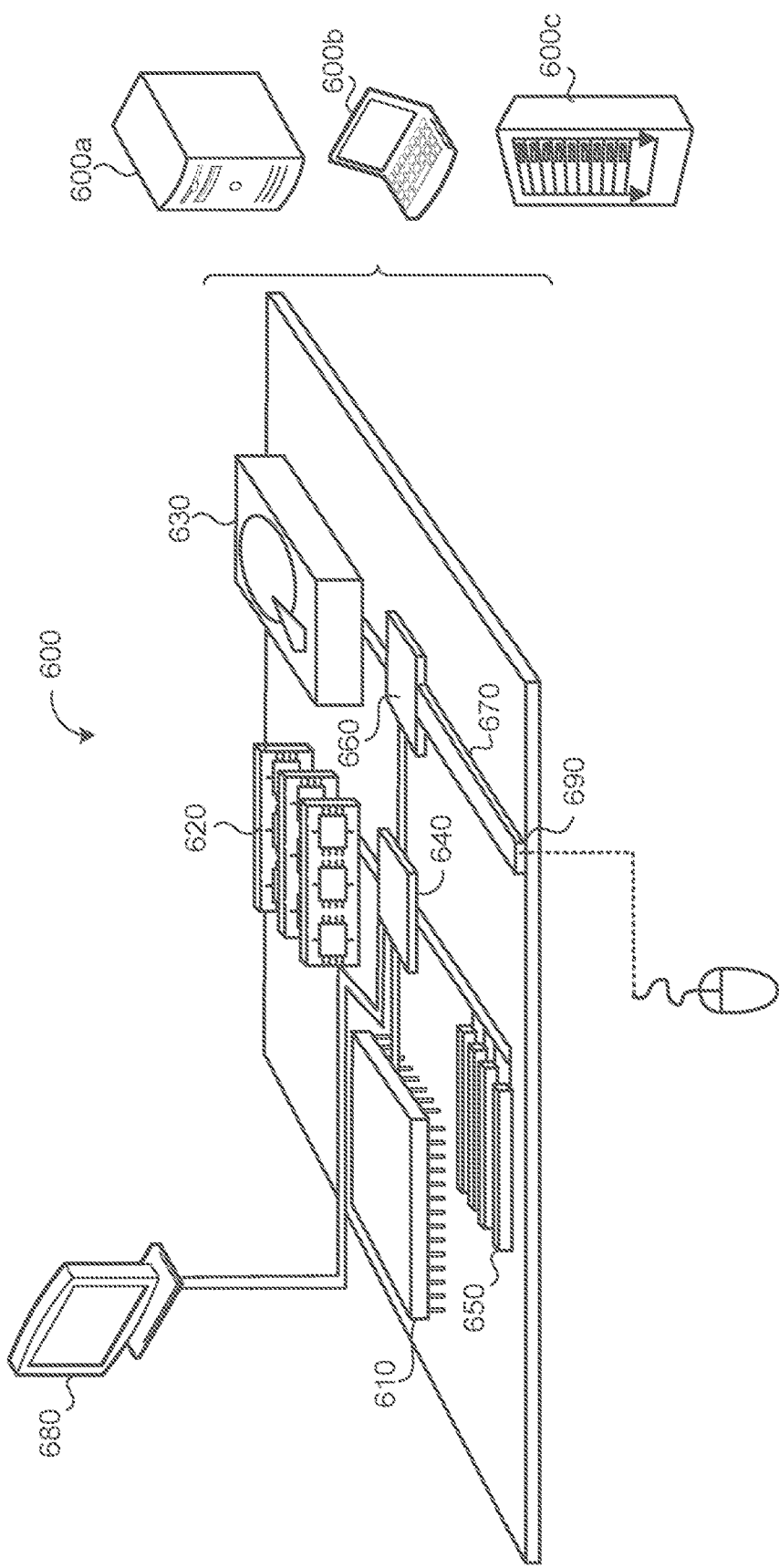
FIG. 6 is a schematic view of an exemplary computing device.

FIG. 6 is schematic view of an example computing device 600 that may be used to implement the systems and methods (e.g., the method 500) described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610 (also referred to as data processing hardware), memory 620 (also referred to as memory hardware), a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid-state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high-speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices, magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that, when executed by data processing hardware, causes the data processing hardware to perform operations comprising:
receiving a document insight request requesting document insights for a corpus of documents from a user device associated with a user, the document insight request comprising:
the corpus of documents;
a set of entities contained within each document of the corpus of documents; and
a document insight request parameter comprising a confidence value target;
obtaining a machine learning model based on the corpus of documents, the machine learning model trained on a training corpus of documents containing the set of entities;
generating, using the machine learning model, the document insights for the corpus of documents based on the document insight request parameter, the document insights for the corpus of documents comprising an accuracy target indicating a ratio of correctly identified entities from the corpus of documents and a user review rate target corresponding to the accuracy target; and
transmitting the document insights to the user device, the document insights, when received by the user device, causing a graphical user interface (GUI) executing on the user device to display the document insights on a display screen of the user device.

2. The computer-implemented method of claim 1, wherein, for each respective entity of the set of entities, the document insights for the corpus of documents further comprises:
an entity-level accuracy target indicating a ratio of correctly identified entities for the respective entity; and
an entity-level user review rate target corresponding to the entity-level accuracy target.

3. The computer-implemented method of claim 1, wherein the operations further comprise:
extracting target features from the corpus of documents, the extracted target features corresponding to the set of entities and suitable for input to the machine learning model,
wherein the machine learning model is configured to:
receive the set of extracted target features as input; and
generate the document insights for the corpus of documents as output.

4. The computer-implemented method of claim 1, wherein the operations further comprise:
determining, using the machine learning model, confidence values for the set of entities based on the training corpus of documents; and
comparing the determined confidence values to the confidence value target to generate the user review rate target,
wherein the user review rate target indicates a ratio of documents in the corpus of documents having a confidence value that fails to satisfy the confidence value target.

5. The computer-implemented method of claim 4, wherein the operations further comprise:
determining, using the machine learning model, accuracy estimates for the set of entities based on the training corpus of documents; and
generating the accuracy target by comparing the accuracy estimates for the set of entities and the ratio of documents in the corpus of documents having the confidence values that fail to satisfy the confidence value target.

6. The computer-implemented method of claim 1, wherein the document insight request further comprises a document type indicator specifying a document type for the corpus of documents.

7. The computer-implemented method of claim 6, wherein the obtaining the machine learning model further comprises selecting the machine learning model from a plurality of machine learning models based on the document type indicator.

8. A system comprising:
data processing hardware; and
memory hardware in communication with the data processing hardware, the memory hardware storing instructions that when executed on the data processing hardware cause the data processing hardware to perform operations comprising:
receiving a document insight request requesting document insights for a corpus of documents from a user device associated with a user, the document insight request comprising:
the corpus of documents;
a set of entities contained within each document of the corpus of documents; and
a document insight request parameter comprising a confidence value target;
obtaining a machine learning model based on the corpus of documents, the machine learning model trained on a training corpus of documents containing the set of entities,
generating, using the machine learning model, the document insights for the corpus of documents based on the document insight request parameter, the document insights for the corpus of documents comprising an accuracy target indicating a ratio of correctly identified entities from the corpus of documents and a user review rate target corresponding to the accuracy target; and
transmitting the document insights to the user device, the document insights, when received by the user device, causing a graphical user interface (GUI) executing on the user device to display the document insights on a display screen of the user device.

9. The system of claim 8, wherein, for each respective entity of the set of entities, the document insights for the corpus of documents further comprises:
an entity-level accuracy target indicating a ratio of correctly identified entities for the respective entity; and
an entity-level user review rate target corresponding to the entity-level accuracy target.

10. The system of claim 8, wherein the operations further comprise:
extracting target features from the corpus of documents, the extracted target features corresponding to the set of entities and suitable for input to the machine learning model,
wherein the machine learning model is configured to:
receive the set of extracted target features as input; and
generate the document insights for the corpus of documents as output.

11. The system of claim 8, wherein the accuracy target indicates a ratio of correctly identified entities from the corpus of documents and the user review rate target corresponds to the accuracy target.

12. The system of claim 8, wherein the operations further comprise:

determining, using the machine learning model, confidence values for the set of entities based on the training corpus of documents; and
comparing the determined confidence values to the confidence value target to generate the user review rate target,
wherein the user review rate target indicates a ratio of documents in the corpus of documents having a confidence value that fails to satisfy the confidence value target.

13. The system of claim 12, wherein the operations further comprise:
determining, using the machine learning model, accuracy estimates for the set of entities based on the training corpus of documents; and
generating the accuracy target by comparing the accuracy estimates for the set of entities and the ratio of documents in the corpus of documents having the confidence values that fail to satisfy the confidence value target.

14. The system of claim 8, wherein the document insight request further comprises a document type indicator specifying a document type for the corpus of documents.

15. The system of claim 14, wherein the obtaining the machine learning model further comprises selecting the machine learning model from a plurality of machine learning models based on the document type indicator.

16. A computer-implemented method that, when executed by data processing hardware, causes the data processing hardware to perform operations comprising:
receiving a document insight request requesting document insights for a corpus of documents from a user device associated with a user, the document insight request comprising:
the corpus of documents;
a set of entities contained within each document of the corpus of documents; and
a document insight request parameter comprising an accuracy target;
obtaining a machine learning model based on the corpus of documents, the machine learning model trained on a training corpus of documents containing the set of entities;
generating, using the machine learning model, the document insights for the corpus of documents based on the document insight request parameter, the document insights for the corpus of documents comprising a confidence value target and a user review rate target,
wherein generating, using the machine learning model, the document insights for the corpus of documents based on the document insight request parameter, comprises:
generating, using the machine learning model, the user review rate target based on the training corpus of documents and the accuracy target; and
generating, using the machine learning model, the confidence value target based on the training corpus of documents,
wherein the confidence value target and the user review rate target are necessary to satisfy the accuracy target for the corpus of documents; and
transmitting the document insights to the user device, the document insights, when received by the user device, causing a graphical user interface (GUI) executing on the user device to display the document insights on a display screen of the user device.

17. The computer-implemented method of claim 16, wherein the operations further comprise:
 receiving a user input adjusting the confidence value target generated by the machine learning model; and
 in response to receiving the user input, updating the confidence value target and the user review rate target to satisfy the adjusted confidence value target for the corpus of documents.

18. A computer-implemented method that, when executed by data processing hardware, causes the data processing hardware to perform operations comprising:
 receiving a document insight request requesting document insights for a corpus of documents from a user device associated with a user, the document insight request comprising:
  the corpus of documents;
  a set of entities contained within each document of the corpus of documents; and
  a document insight request parameter comprising a user review rate target;
 obtaining a machine learning model based on the corpus of documents, the machine learning model trained on a training corpus of documents containing the set of entities;
 generating, using the machine learning model, the document insights for the corpus of documents based on the document insight request parameter, the document insights for the corpus of documents comprising a confidence value target and an accuracy target, wherein generating, using the machine learning model, the document insights for the corpus of documents based on the document insight request parameter, comprises:
  generating, by the machine learning model, the confidence value target based on the training corpus of documents; and
  generating, by the machine learning model, the accuracy target based on the training corpus of documents and the user review rate target,
  wherein the confidence value target and the accuracy target are necessary to satisfy the accuracy target for the corpus of documents; and
 transmitting the document insights to the user device, the document insights, when received by the user device, causing a graphical user interface (GUI) executing on the user device to display the document insights on a display screen of the user device.

\* \* \* \* \*